Feb. 24, 1959 G. F. JONES 2,874,758
FOAM RUBBER CUSHION
Filed Jan. 28, 1958 2 Sheets-Sheet 1

INVENTOR.
GORDON F. JONES
BY
W. A. Fraser
ATTY.

Feb. 24, 1959　　　　　G. F. JONES　　　　2,874,758
FOAM RUBBER CUSHION
Filed Jan. 28, 1958　　　　　　　　　　　2 Sheets-Sheet 2

INVENTOR.
GORDON F. JONES
BY
*W. A. Fraser*
ATTY.

United States Patent Office 2,874,758
Patented Feb. 24, 1959

2,874,758
FOAM RUBBER CUSHION

Gordon Franklin Jones, Akron, Ohio, assignor to The Firestone Tire & Rubber Company, Akron, Ohio, a corporation of Ohio Application January 28, 1958, Serial No. 711,754

3 Claims. (Cl. 155—178)

This invention relates to improved foam rubber cushions and to methods of manufacturing the same.

The present invention is particularly useful for deep furniture cushions which are molded of foam rubber or of foam plastic material such as polyurethane. Such cushions have conventionally been molded for many years with the sides or edges of the cushions convexly rounded. When such cushions are covered, it is intended that the central portions of the sides of the cushions will be squeezed inwardly and both upwardly and downwardly toward the top and bottom edges of the cushion so as to fill the cover of the cushion completely. Although millions of such cushions have been sold over a period of many years, it has never occurred to anyone prior to the present invention to take a diametrically opposite view and to mold the sides of the cushions concavely so that the top and bottom edges of the cushion protrude laterally beyond the central or edge portions of the sides. When such a cushion is covered with a cover whose lateral dimensions are somewhat shorter than the corresponding dimensions of the cushion, the protruding edges of the cushion are forced laterally inwardly by the cover to produce localized portions of compressed rubber at the edges. The result is that the covered cushion has increased firmness at the very points where added firmness is most needed. As a further advantage, such a cushion will have a better fit within a cover, with less tendency to shift within the cover and with a better fit of the cushion within the article of furniture in which it is used. Such a cushion presents a neater, more uniform appearance with square corners and edges, much more so than the cushions which have been heretofore used. The invention can be practiced with as-molded cushions or may be advantageously practiced with cushions hand-fabricated from conventional building stock materials so as to have the required contour.

These and further advantages and objects will be more fully apparent from the following description of a preferred form of invention in which.

Figure 1:
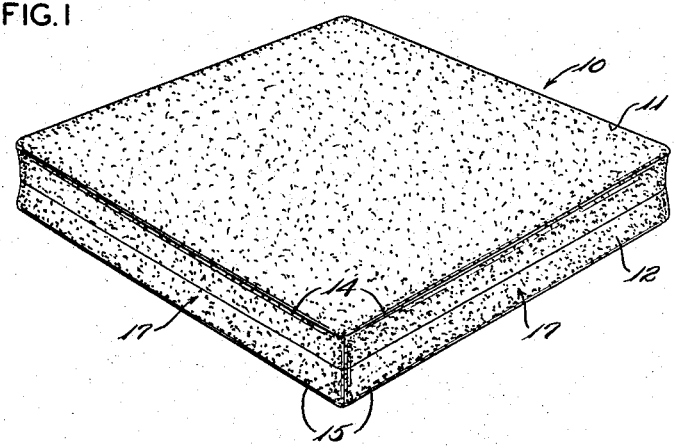
Figure 1 is a perspective view of an uncovered foam latex cushion embodying the invention.

Referring first to Figure 1, the invention is shown embodied in a deep furniture cushion 10 which is assembled by cementing together two molded halves 11 and 12. The halves are of conventional cored construction and are identical so that in the finished cushion the cores 13 face each other, see Figure 2. The cushion of the present example in the uncovered condition is square in shape, measuring 22¾ inches on each side. The total thickness is about 5⅛ inches at the center and about 3¾ inches at the edges.

Figure 2:
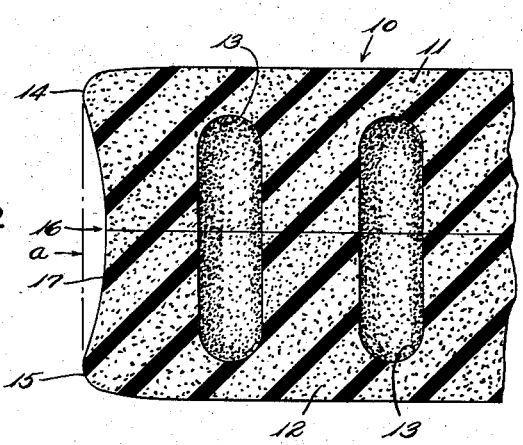
Figure 2 is a fragmentary view of the cushion of Figure 1, in vertical section, and on an enlarged scale, to show the edge contour.

The features of the invention are best shown in Figure 2 in which it will be seen that the top and bottom edges 14 and 15, respectively, protrude laterally beyond the central portion 16 of one of the sides 17 of the cushion so that the side is concave in cross-section. In the present example, the overhang of the edges, indicated by "a" in Figure 2, is about ⅜ inch but it may of course vary in extent depending on the size, thickness and other properties of the cushion. It is to be noted, too, that the edges 14 and 15 are slightly rounded.

According to the invention, the cushion 10 is to be fitted within a cover indicated generally at 18 which comprises a body of suitable fabric reinforced at the edges with conventional beading or piping 19. The dimensions of the cover are such that the cushion 10 is compressed somewhat when it is inserted in the cover. Thus the top 20 and bottom 21 of the cover are about 22 inches, while the sides 22 of the cover are 3½ inches, slightly smaller than the cushion. With such relative dimensions, the cushion is compressed vertically and also laterally in both directions with the result that the edges 14 and 15 are compressed into the body of the cushion so that the edge portions tend to have a greater firmness than would otherwise be the case with conventional cushions. Such compressed portions are indicated diagrammatically by the shaded areas in Figure 3. When the cover and the cushion are assembled, the cover is stretched taut over the cushion and the cushion presents a trim, square appearance.

Figure 3:
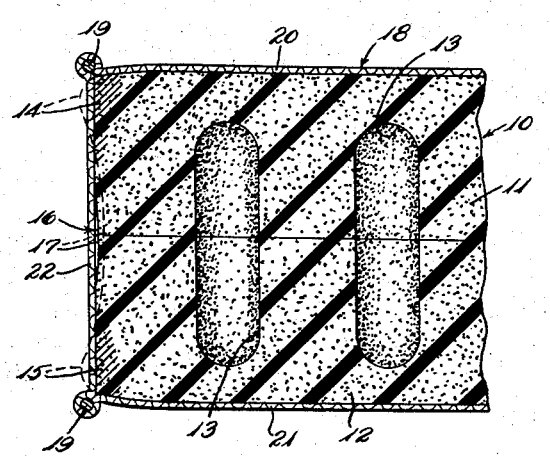
Figure 3 is a view similar to Figure 2 showing the manner in which a cover fits over the cushion of Figures 1 and 2.
Figure 4:
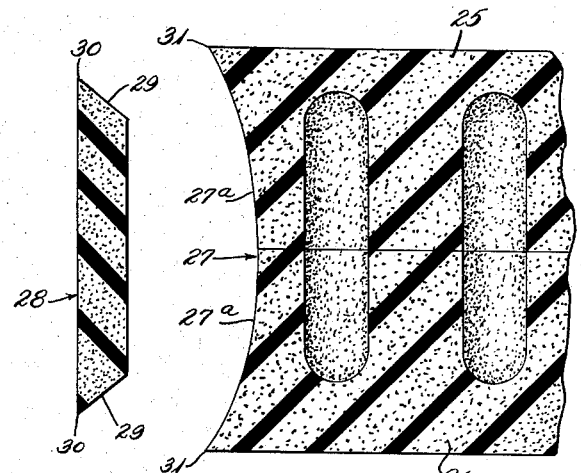
Figures 4, 5 and 6 are views similar to Figure 2 showing the successive steps by which a cushion embodying the invention may be built up from stock material.
Figure 5:
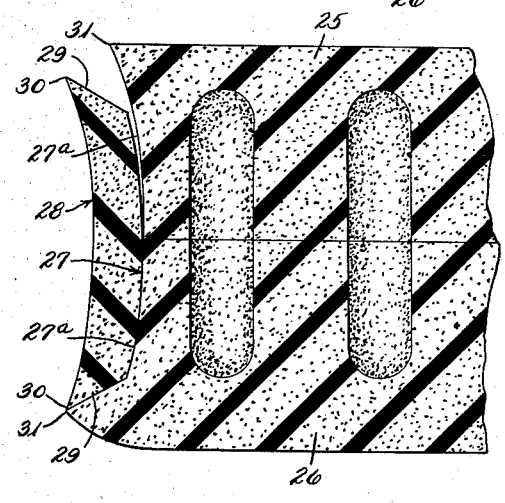

The cushion just described with reference to Figures 1–3 is preferably molded in two halves and then cemented together. In some cases, as where only a few cushions of any one size are required, the cushion may be assembled by hand, using cored slab stock, cut and trimmed to size and cemented together in the manner indicated in Figures 4–6, inclusive. In such cases, two pieces of flat slab stock 25 and 26 are cut to the required size and cemented together with their cored sides abutting each other. The sides 27a of the slabs are cut so that the sides 27 of the cushion are concave in shape as best shown in Figure 4. A side finishing strip 28 cut from flat stock and with its longitudinal edge portions chamfered as indicated at 29, see Figure 4, is then cemented to each of the sides 27 in the manner shown in Figure 5 with the edges 30 of the strip meeting the edges 31 of the slab stock.

Figure 6:
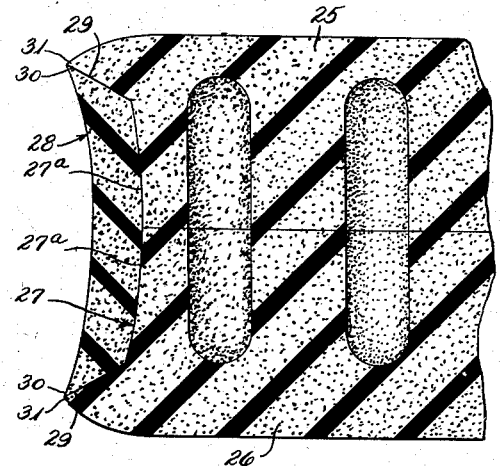

The slab stock and side strips, when assembled in this manner, react upon each other to form the finished cushion shown in Figure 6 with the generally concave sides 27 of the slab stock pulling the central portion of the strip 28 into a conforming concave shape and with the chamfered surfaces 29 pulling the edges 31 of the slab stock inwardly to form the rounded cushion edges as shown.

The cushions of such construction have a number of advantages. The manner in which the compression of the cushion takes place within the cover gives the cushion more thrust at the boxing edges and, accordingly, gives the covered cushion straight, square lines enabling the cushion to fit snugly against the supporting surfaces of a davenport or chair and minimizing the gaping between adjacent cushions. The controlled compression of the cushion also helps to eliminate creeping of a cushion within its cover and, in contrast with conventional cushions, minimizes any tendency of the cement lines to show through the cover. Such a design also reduces the amount of foam material used in the cushions, a savings which is significant where large numbers of standard size cushions are involved.

The essential features of the invention are summarized in the appended claims:

I claim:

1. A resilient foam cushion of substantial thickness having a top, a bottom and a plurality of sides, the top and bottom edges on all sides protruding laterally beyond the central portions of the sides by a substantial amount.

2. In combination, a resilient foam cushion of substantial thickness having a top, a bottom and a plurality of sides, said sides being concave with the top and bottom edges protruding laterally beyond the central portions of the sides by a substantial amount and a cover having lateral dimensions smaller than the corresponding lateral dimensions of said cushion whereby when said cushion and cover are assembled, said protruding edges are compressed laterally into said cushion.

3. The method of making a resilient foam furniture cushion which comprises cutting two pieces of slab stock to size and cementing the cored surfaces together to form a cushion body having top and bottom surfaces and generally concave sides and cementing longitudinal strips having chamfered edge portions to said concave sides with the edges of said strip meeting the edges of said body.

References Cited in the file of this patent

FOREIGN PATENTS 243,994    Great Britain _____ Dec. 10, 1925